United States Patent
Tamura et al.

(10) Patent No.: US 9,240,041 B2
(45) Date of Patent: Jan. 19, 2016

(54) DEFECT INSPECTION DEVICE, DEFECT INSPECTION METHOD, AND DEFECT INSPECTION PROGRAM

(71) Applicant: Lasertec Corporation, Kanagawa (JP)

(72) Inventors: Tomoya Tamura, Kanagawa (JP); Hiroyuki Miyamoto, Kanagawa (JP)

(73) Assignee: Lasertec Corporation, Kanagawa (JP)

( * ) Notice: Subject to any disclaimer, the term of this patent is extended or adjusted under 35 U.S.C. 154(b) by 333 days.

(21) Appl. No.: 13/903,673

(22) Filed: May 28, 2013

(65) Prior Publication Data

US 2013/0322735 A1    Dec. 5, 2013

(30) Foreign Application Priority Data

May 30, 2012  (JP) .................. 2012-123213

(51) Int. Cl.
*G06K 9/00*    (2006.01)
*G06T 7/00*    (2006.01)

(52) U.S. Cl.
CPC .............. *G06T 7/0004* (2013.01); *G06T 7/001* (2013.01); *G06T 2207/30148* (2013.01)

(58) Field of Classification Search
CPC .................. G06T 2207/30148; G06T 7/0004; G06T 2207/20021; G06T 2207/30141
See application file for complete search history.

(56) References Cited

U.S. PATENT DOCUMENTS

| | | | | |
|---|---|---|---|---|
| 2002/0167487 A1* | 11/2002 | Miller et al. | ................. | 345/156 |
| 2004/0228515 A1* | 11/2004 | Okabe et al. | ................. | 382/145 |
| 2006/0270072 A1* | 11/2006 | Ikenaga | ................. | G03F 1/84 |
| | | | | 438/14 |
| 2007/0236690 A1* | 10/2007 | Kimba et al. | .............. | 356/237.4 |
| 2010/0246933 A9* | 9/2010 | Hiroi et al. | .................... | 382/145 |
| 2011/0071783 A1* | 3/2011 | Kageyama | ...................... | 702/83 |
| 2012/0114220 A1* | 5/2012 | Srocka | ................... | G01N 21/95 |
| | | | | 382/144 |
| 2012/0207381 A1* | 8/2012 | Ong et al. | ..................... | 382/144 |
| 2013/0231769 A1* | 9/2013 | Tien | ........................ | G06T 7/001 |
| | | | | 700/121 |

FOREIGN PATENT DOCUMENTS

| | | |
|---|---|---|
| JP | 61071630 A | 4/1986 |
| JP | 11295235 A | 10/1999 |
| JP | 2005217060 | 8/2005 |

OTHER PUBLICATIONS

Japanese Office Action as issued in corresponding to Japanese Patent Application No. 2012-123213 (with English translation).

* cited by examiner

*Primary Examiner* — Stephen R Koziol
*Assistant Examiner* — Jonathan S Lee
(74) *Attorney, Agent, or Firm* — Maier & Maier, PLLC

(57) ABSTRACT

A defect inspection device according to one aspect of the present invention includes a light source, a detector that receives light from an illuminated region of a sample, a stage that changes a relative position between light from the light source and the sample in order to sequentially inspect a plurality of unit inspection regions, a comparator that compares a detection signal output from the detector with a threshold according to scanning in the stage, a mask position setting unit that sets a common position of the plurality of unit inspection regions as a mask position in order to mask the common position when the plurality of unit inspection regions are sequentially inspected, and a defect detection unit that detects a defect based on a comparison result in the comparison unit in another region than the mask position.

17 Claims, 8 Drawing Sheets

DEFECT INSPECTION DEVICE, DEFECT INSPECTION METHOD, AND DEFECT INSPECTION PROGRAM

RELATED APPLICATIONS

This application claims priority under 35 U.S.C. §119 to Japanese Patent Application No. 2012-123213, filed May 30, 2012, the disclosure of which is incorporated by reference herein in its entirety.

BACKGROUND OF THE INVENTION

1. Field of the Invention

The present invention relates to a defect inspection device, a defect inspection method, and a defect inspection program, and more specifically, to a defect inspection device, a defect inspection method, and a defect inspection program that receive light from a sample to detect defects.

2. Description of Related Art

Japanese Unexamined Patent Application Publication No. 2005-217060 discloses a defect inspection device that detects defects in a semiconductor integrated circuit using a camera that takes patterns. This defect inspection device detects defects by comparing images that are taken (paragraph 0030). Further, in the method disclosed in Japanese Unexamined Patent Application Publication No. 2005-217060, defects are detected based on images in which only regions other than a region where false defects tend to occur are displayed. The region where the false defects tend to occur is determined according to a circuit pattern (wiring pattern) of a sample.

Because of color unevenness due to a contrast difference of irregularities caused by crystal grains grown on a wiring, for example, false defects are generated which appear to be a plurality of real defects. In order to prevent occurrence of such false defects, a region in which the intensity of reflected light becomes equal to or larger than a predetermined threshold is set as a false defect occurrence region (paragraph 0039).

In Japanese Unexamined Patent Application Publication No. 2005-217060, the false defect occurrence region is set based on a position according to the pattern of the sample. This causes a problem that it is impossible to prevent occurrence of false defects that occur regardless of patterns of the sample.

The present invention aims to provide a defect inspection device, a defect inspection method, and a defect inspection program that are capable of preventing occurrence of false defects and performing defect inspection with high sensitivity.

SUMMARY OF THE INVENTION

A defect inspection device according to a first aspect of the present invention includes: a light source that illuminates a sample; a detector that receives light from an illuminated region of the sample; a first scanning unit that changes a relative position between light from the light source and the sample in order to sequentially inspect a plurality of unit inspection regions; a comparison unit that compares a detection signal output from the detector according to scanning in the first scanning unit with a threshold; a mask position setting unit that sets a common position of the plurality of unit inspection regions as a mask position in order to mask the common position when the first scanning unit sequentially inspects the plurality of unit inspection regions; and a mask processing unit that detects a defect based on a comparison result in the comparison unit in another region than the mask position set by the mask position setting unit. According to this configuration, it is possible to prevent occurrence of false defects and to perform defect inspection with high sensitivity.

A defect inspection device according to a second aspect of the present invention is the defect inspection device stated above, in which the unit inspection region has a predetermined size which does not depend on a pattern of the sample. Accordingly, it is possible to set the mask position regardless of the pattern of the sample, which achieves simple inspection.

A defect inspection device according to a third aspect of the present invention is the defect inspection device stated above, and further includes a second scanning unit that deflects illumination light in the unit inspection region, in which the mask position is set in the unit inspection region based on at least one of a predetermined scanning position in a scanning direction of the second scanning unit and a predetermined position in a direction perpendicular to the scanning direction. Accordingly, it is possible to decrease the area of the mask position and to reduce the probability that real defects are erased.

A defect inspection device according to a fourth aspect of the present invention is the defect inspection device stated above, and includes: detecting a defect candidate according to a result of comparing the detection signal with the threshold; and setting a position where the defect candidate is detected in at least two unit inspection regions as the mask position. Accordingly, it is possible to perform inspection with higher accuracy.

A defect inspection device according to a fifth aspect of the present invention is the defect inspection device stated above, and further includes a multiple-beam conversion unit that converts the light from the light source into multiple beams including a plurality of light beams, in which the mask position is set only for a part of the plurality of light beams. Accordingly, it is possible to decrease the area of the mask position and to reduce the probability that real defects are erased.

A defect inspection device according to a sixth aspect of the present invention is the defect inspection device stated above, and includes: detecting a defect candidate according to a result of comparing the detection signal with the threshold; and determining that the defect candidate is a defect when a size of the defect candidate in the mask position is larger than an erase size. Accordingly, it is possible to erase false defects and to perform accurate inspection.

A defect inspection device according to a seventh aspect of the present invention is the defect inspection device stated above, includes: detecting a defect candidate according to a result of comparing the detection signal with the threshold; and further includes: a merge processing unit that merges a defect candidate according to a distance to a neighboring defect candidate after the mask position is masked. Accordingly, even when the defect candidate of the mask position is erased, it is possible to accurately measure the defect size.

A defect inspection device according to an eighth aspect of the present invention is the defect inspection device stated above, in which the mask position is set based on a comparison result in a part of the plurality of unit inspection regions. Accordingly, it is possible to properly set the mask position and to perform accurate inspection.

A defect inspection device according to a ninth aspect of the present invention is the defect inspection device stated above, in which the mask position is adjusted for each of the unit inspection regions according to the comparison result in the comparison unit. Accordingly, it is possible to perform accurate inspection.

A defect inspection method according to a tenth aspect of the present invention includes the steps of: illuminating a sample; receiving light from an illuminated region of the sample to output a detection signal; changing a relative position between light from a light source and the sample to perform a first scanning in order to sequentially inspect a plurality of unit inspection regions; comparing a detection signal output from the detector with a threshold according to the first scanning; setting a common position of the plurality of unit inspection regions as a mask position in order to mask the common position when the plurality of unit inspection regions are sequentially inspected by the first scanning; and detecting a defect based on a result of comparing the detection signal with the threshold in another region than the mask position. According to this method, it is possible to prevent occurrence of false defects and to perform defect inspection with high sensitivity.

A defect inspection method according to an eleventh aspect of the present invention is the defect inspection method stated above, in which the unit inspection region has a predetermined size which does not depend on a pattern of the sample. Accordingly, it is possible to set the mask position without depending on the pattern of the sample, thereby being able to perform inspection in a simple manner.

A defect inspection method according to a twelfth aspect of the present invention is the defect inspection method stated above, and further includes a step of performing a second scanning by deflecting illumination light in the unit inspection region, in which the mask position is set in the unit inspection region according to at least one of a predetermined scanning position in a scanning direction of the second scanning and a position perpendicular to the scanning direction. Accordingly, it is possible to decrease the area of the mask position, thereby being able to reduce the probability that the real detect is erased.

A defect inspection method according to a thirteenth aspect of the present invention is the defect inspection method stated above, and includes detecting a defect candidate according to a result of comparing the detection signal with the threshold; and setting a position where the defect candidate is detected in at least two unit inspection regions as the mask position. Accordingly, it is possible to perform inspection with higher accuracy.

A defect inspection method according to a fourteenth aspect of the present invention is the defect inspection method stated above, and further includes a step of converting the light from the light source into multiple beams including a plurality of light beams, in which the mask position is set only for a part of the plurality of light beams. Accordingly, it is possible to decrease the area of the mask position, thereby being able to reduce the probability that the real detect is erased.

A defect inspection method according to a fifteenth aspect of the present invention is the defect inspection method stated above, and includes: detecting a defect candidate according to a result of comparing the detection signal with the threshold; and determining that the defect candidate is a defect when a size of the defect candidate in the mask position is larger than an erase size. Accordingly, it is possible to erase false defects and to perform accurate inspection.

A defect inspection method according to a sixteenth aspect of the present invention is the defect inspection method stated above, and further includes the steps of: detecting a defect candidate according to a result of comparing the detection signal with the threshold; and merging a defect candidate according to a distance to a neighboring defect candidate after masking the mask position. Accordingly, even when the defect candidate of the mask position is erased, it is possible to accurately measure the defect size.

A defect inspection method according to a seventeenth aspect of the present invention is the defect inspection method stated above, and includes setting the mask position based on a comparison result in a part of the plurality of unit inspection regions. Accordingly, it is possible to properly set the mask position and to perform accurate inspection.

A defect inspection method according to an eighteenth aspect of the present invention is the defect inspection method stated above, and includes adjusting the mask position for each of the unit inspection regions according to the comparison result in the comparing step. Accordingly, it is possible to perform accurate inspection.

A defect inspection program according to a nineteenth aspect of the present invention is a defect inspection program for performing defect inspection using a detection signal from a detector that receives light from an illuminated region of a sample, the defect inspection program causing a computer to execute the following steps of: changing a relative position between light from a light source and the sample to perform a first scanning in order to sequentially inspect a plurality of unit inspection regions; comparing a detection signal output from the detector with a threshold according to the first scanning; setting a common position of the plurality of unit inspection regions as a mask position in order to mask the common position when the plurality of unit inspection regions are sequentially inspected by the first scanning; and detecting a defect based on a result of comparing the detection signal with the threshold in another region than the mask position. According to this program, it is possible to prevent occurrence of false defects and to perform defect inspection with high sensitivity.

According to the present invention, it is possible to provide a defect inspection device, a defect inspection method, and a defect inspection program that are capable of preventing occurrence of false defects and performing defect inspection with high sensitivity.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the drawings, an embodiment of the present invention will be described. The following description shows a preferred embodiment of the present invention, and the scope of the present invention is not limited to the following embodiment. In the following description, the components denoted by the same reference symbols substantially indicate the same contents.

Figure 1:
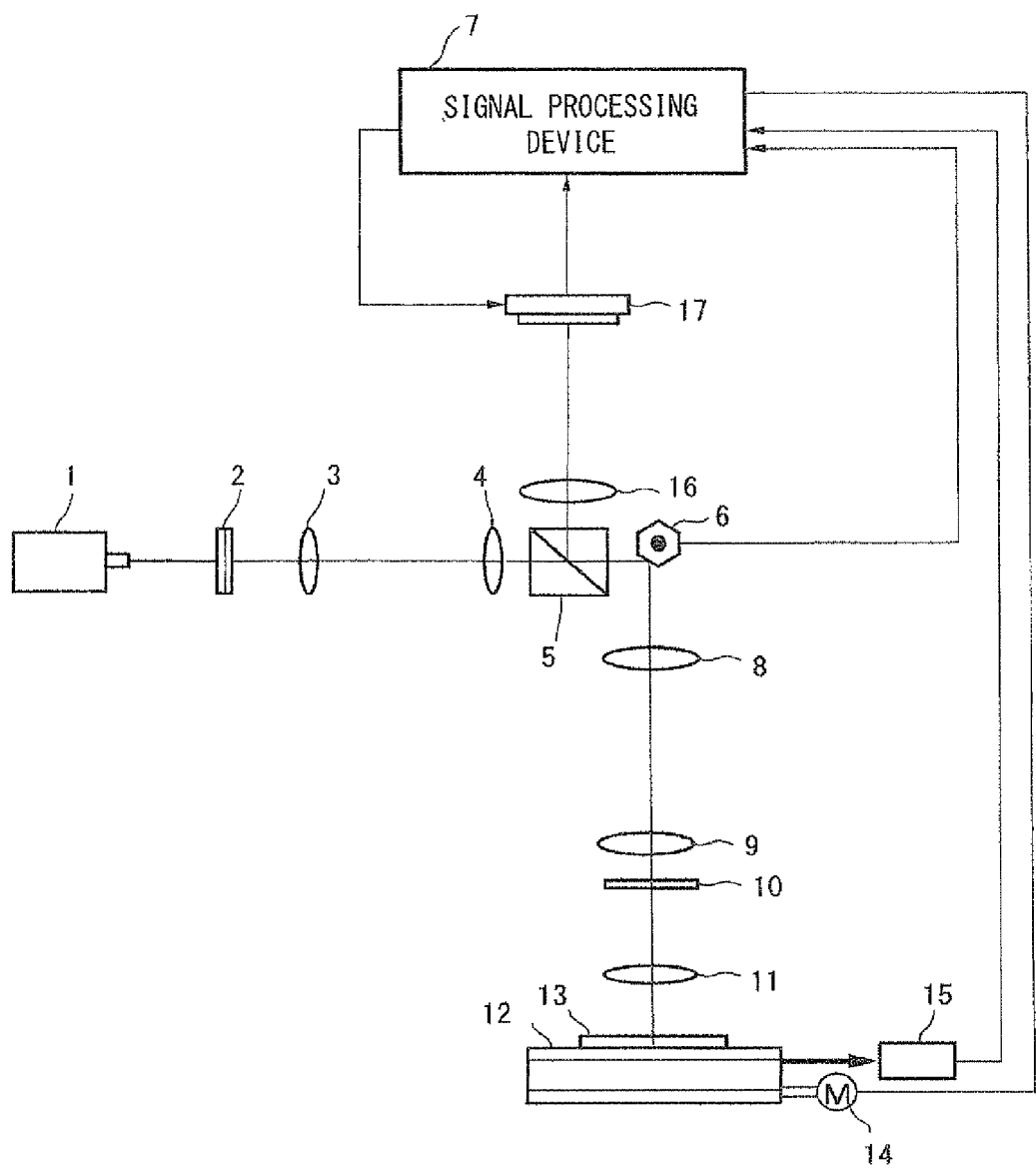
FIG. 1 is a diagram schematically showing a whole configuration of a defect inspection device according to an embodiment.

With reference to FIG. 1, a configuration of a defect inspection device according to an embodiment will be described. FIG. 1 is a diagram showing a whole configuration of the defect inspection device. The defect inspection device includes a light source 1, a diffraction grating 2, relay lenses 3 and 4, a polarizing beam splitter 5, a polygon mirror 6, a signal processing device 7, relay lenses 8 and 9, a quarter wavelength plate 10, an objective lens 11, a stage 12, a drive motor 14, a position sensor 15, and a detector 17. While a sample 13 which is a target to be inspected may be a semiconductor device or a photomask, for example, the target to be inspected is not particularly limited.

The light source 1 emits illumination light that illuminates the sample 13, for example. The light source 1 may be, for example, a continuous-wave laser light source or a pseudo continuous-wave laser light source. As specific examples, harmonic waves of YAG laser or Ar gas laser may be used. As a matter of course, light sources other than the laser light source (e.g., a mercury lamp, a xenon lamp) may be used.

The laser beam emitted from the light source 1 is made incident on the diffraction grating 2. The diffraction grating 2 is, for example, a holographic diffraction grating, and generates a plurality of beams (multiple beams). The diffraction grating 2 generates one-dimensional multiple beams in which multiple beams are one-dimensionally aligned. The one-dimensional multiple beams generated by the diffraction grating 2 are aligned along a direction perpendicular to the drawing sheet. Now, the direction in which the multiple beams are aligned is indicated by a Y direction. Alternatively, the diffraction grating 2 may generate two-dimensional multiple beams in which multiple beams are two-dimensionally aligned. In this way, the diffraction grating 2 converts the laser beam into m (m is an integer of one or larger)×n (n is an integer of two or larger) beam arrays. Multiple beams may be naturally generated by other means than the diffraction grating 2. Alternatively, multiple beams may be generated using a plurality of laser light sources.

The multiple beams from the diffraction grating 2 are relayed by the relay lens 3 and the relay lens 4 and are made incident on the polarizing beam splitter 5. The polarizing beam splitter 5 transmits or reflects light according to a polarization state of the incident light. For example, the polarizing beam splitter 5 transmits P-polarized light and reflects S-polarized light. The multiple beams transmitted through the polarizing beam splitter 5 are made incident on the polygon mirror 6.

The polygon mirror 6 is controlled by the signal processing device 7 so as to be rotated at a constant rotation speed. Accordingly, the polygon mirror 6 serves as a scanner that scans the illumination light. The rotational axis of the polygon mirror 6 is in a direction perpendicular to the drawing sheet. Thus, the polygon mirror 6 deflects the multiple beams in the horizontal direction shown in FIG. 1 to perform one-dimensional scanning. Now, the scanning direction of the polygon mirror 6 is indicated by an X direction. Further, information on a rotation position of the polygon mirror 6 is input to the signal processing device 7. In short, the information on the scanning position by the polygon mirror 6 is input to the signal processing device 7. Accordingly, it is possible to detect the positions on the sample 13 the multiple beams are made incident on. As a matter of course, the multiple beams can be scanned using a galvano mirror in place of the polygon mirror 6. Furthermore, other scanners such as a micro electronics mechanics systems (MEMS) mirror may be used.

The multiple beams deflected by the polygon mirror 6 are relayed by the relay lens 8 and the relay lens 9 and are made incident on the quarter wavelength plate 10. The quarter wavelength plate 10 changes the polarization state of the incident light. For example, the light beams transmit through the quarter wavelength plate 10 twice in optical paths to and from the sample 13, whereby the P-polarized light becomes the S-polarized light. Note that a half mirror may be used in place of the polarizing beam splitter 5. In this case, the quarter wavelength plate 10 is not necessary.

The light beams transmitted through the quarter wavelength plate 10 are made incident on the objective lens 11. The objective lens 11 focuses the multiple beams into micro spot beams, to form a spot array of multiple beams on the sample 13 placed on the stage 12. In summary, each of the multiple beams that are aligned forms a micro spot on the sample 13. For example, the spot of each light beam has a circular shape which is 0.5 µm in diameter. Further, the interval between neighboring spots may be set to 2 µm. Further, by the rotation of the polygon mirror 6, the multiple beams are scanned in the X direction perpendicular to the direction in which the multiple beams are aligned.

The light reflected by the sample 13 is then made incident on the polygon mirror 6 along the same optical path as the illumination light. Specifically, the reflected light is made incident on the polygon mirror 6 through the objective lens 11, the quarter wavelength plate 10, the relay lens 9, and the relay lens 8. As a matter of fact, the reflected light is also multiple beams in which a plurality of light beams are one-dimensionally aligned, as is similar to the illumination light. The polygon mirror 6 de-scans the reflected light by deflecting the reflected light.

The reflected light de-scanned by the polygon mirror 6 is reflected by the polarizing beam splitter 5. The light reflected by the polarizing beam splitter 5 is imaged by an image forming lens 16 and is then made incident on the detector 17. One-dimensional photo diode array may be used as the detector 17. Specifically, the detector 17 includes photo diodes that are aligned in the Y direction. Each photo diode serves as a light receiving pixel having an opening on a pinhole. The reflected light from a light spot is then detected by the photo diode through the pinhole. The photo diodes each output a detection signal according to a light receiving amount. As a matter of course, the detector 17 including light receiving elements other than photo diodes may be used instead. For example, a CMOS sensor, a CCD sensor or the like may be used as the detector 17. As a matter of course, a plurality of photo detectors such as photo diodes may be arranged.

The detector 17 mainly detects regular reflection light from the sample 13. Further, since the detector 17 is conjugated with the front surface of the sample and its detection size is small, it forms a bright field confocal optical system.

When the front surface of the sample 13 is normal, the regular reflection light from the front surface of the sample is made incident on each photo diode. Each of the photo diodes outputs a detection signal having predetermined luminance to the signal processing device 7. Meanwhile, when there is a foreign matter defect or the like on the front surface of the sample, illumination light is scattered by the foreign matter. Specifically, the amount of light that is made incident on the photo diodes is reduced in the defective part, and the level of the detection signal is lowered. The level of the detection signal is also lowered in the defective part where the front surface of the sample 13 has a convex defect or a concave defect. The signal processing device 7 compares the detection signal output from the detector 17 with a threshold (slice level) to store the comparison result in a memory or the like. The signal processing device 7 performs defect inspection based on this comparison result. The signal processing device 7 is a personal computer, for example, and performs predetermined arithmetic processing. The stage 12 that supports the sample 13 is driven by the drive motor 14.

The stage 12 is an XY stage that moves in the XY directions. The drive motor 14 is a servo motor, for example, controlled by the signal processing device 7. Accordingly, the signal processing device 7 controls the drive motor 14, thereby being able to scan the positions of the multiple beams on the sample 13. Further, the position sensor 15 is provided in the stage 12. The position sensor 15 detects the drive position of the stage 12 to output information on the drive position to the signal processing device 7. This allows the signal processing device 7 to detect the scanning position. As a matter of course, scanning may be performed by moving the optical system including the objective lens 11 instead of moving the stage 12.

The signal processing device 7 controls scanning by the polygon mirror 6 and the drive motor 14. Further, the information on the rotation position from the polygon mirror 6 and the information on the drive position from the position sensor 15 are input to the signal processing device 7. Thus, the signal processing device 7 knows which position on the sample 13 each of the multiple beams is made incident on. The signal processing device 7 further compares detection signals with the threshold to generate comparison signals. The signal processing device 7 stores the comparison signal in a memory or the like.

The signal processing device 7 sets, for example, a defect candidate in which the detection signal exceeds the threshold as 1 and a normal position in which the detection signal does not exceed the threshold as 0. Accordingly, the signal processing device 7 is able to perform digital signal processing. The signal processing device 7 obtains the size of the defect candidate from the range in which the detection signals successively exceed the threshold. The size and the position (coordinates) of the defect candidate on the sample 13 are stored in association with each other from the data of the comparison signal. The signal processing device 7 then stores the position of the defect candidate associated with the size of the defect candidate as a defect candidate map.

Figure 2:
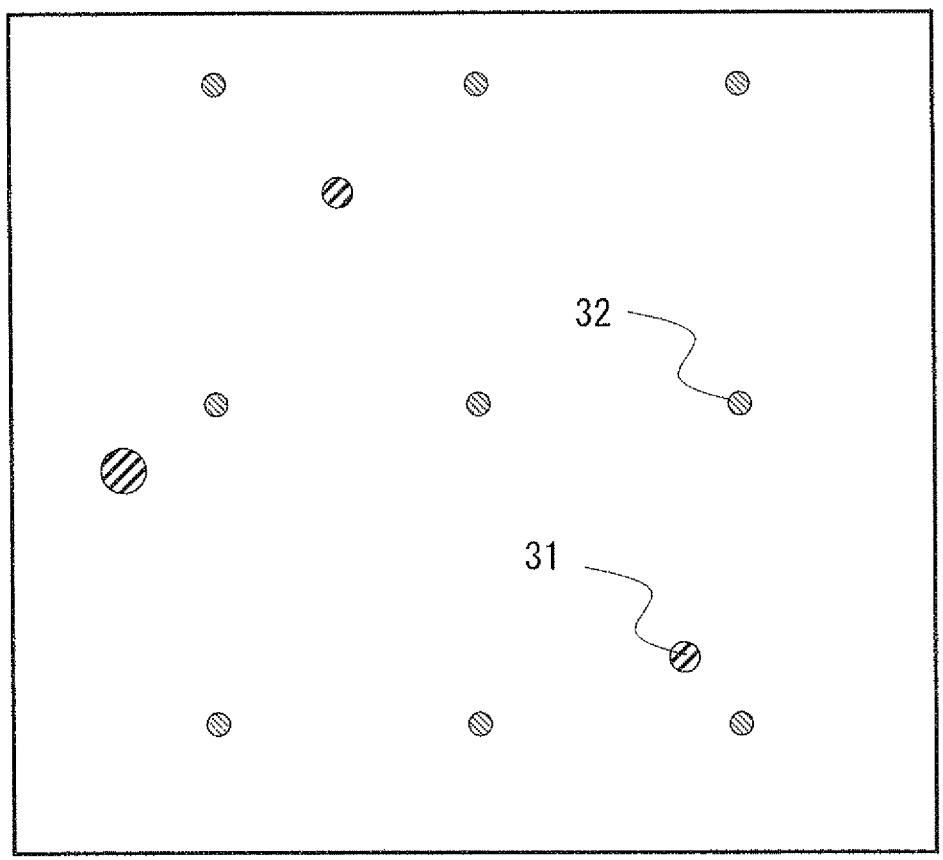
FIG. 2 is a diagram showing false defects and real defects detected by the defect inspection device.

The defect inspection device according to the embodiment compares the detection signals with the threshold to detect defects based on the comparison results. However, due to various reasons, the luminance of the reflected light from the normal position which is not a defect may be weakened or strengthened. In this case, the normal position is detected as a false defect. This causes a situation in which real defects 31 and false defects 32 are mixed in the defect candidate map, as shown in FIG. 2. When the threshold is lowered in order to increase the detection sensitivity, the number of false defects 32 increases as well. In this embodiment, the following mask processing is performed, which can prevent occurrence of the false defects 32 and perform defect inspection with high sensitivity.

Figure 3:
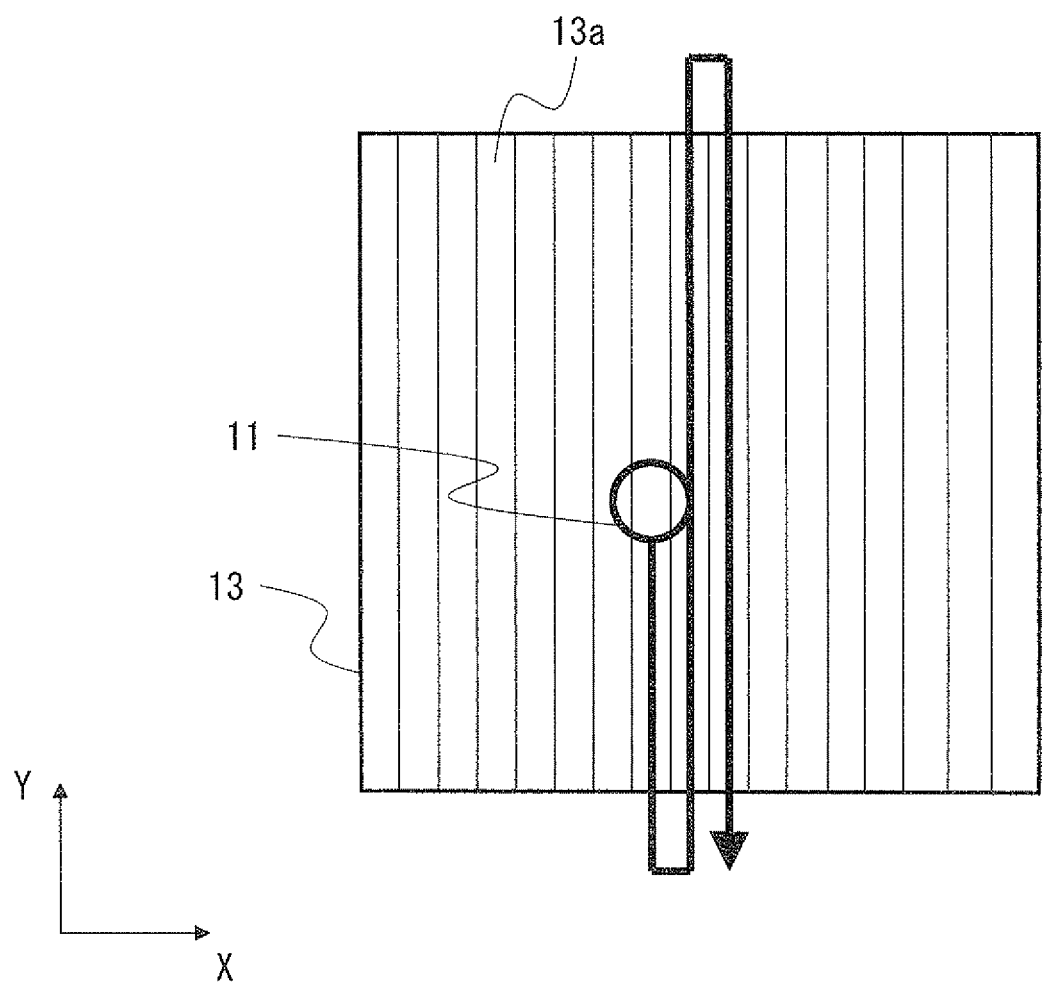
FIG. 3 is a diagram showing a scanning path by a stage of the defect inspection device.

First, with reference to FIG. 3, a scanning path by the drive motor 14 will be described. FIG. 3 is a plane view showing scanning by the drive of the stage 12. In FIG. 3, the trajectory of the objective lens 11 by scanning of the stage 12 is shown by an arrow. The stage 12 moves from one end to the other end of the sample 13 in the −Y direction. Strip-like inspection stripe regions 13a extending in the Y direction are thus inspected.

Next, the stage 12 is moved in the −X direction by the width of the inspection stripe region. The stage 12 is then moved in the +Y direction, and the next inspection stripe region 13a is inspected. In this way, the stage 12 is moved in a zigzag manner. The inspection stripe regions 13a are sequentially inspected from the left inspection stripe region 13a. While shown in FIG. 3 is an example in which inspection is performed by dividing the sample 13 into 17 inspection stripe regions 13a, setting of the inspection stripe regions 13a is not particularly limited.

Figure 4:
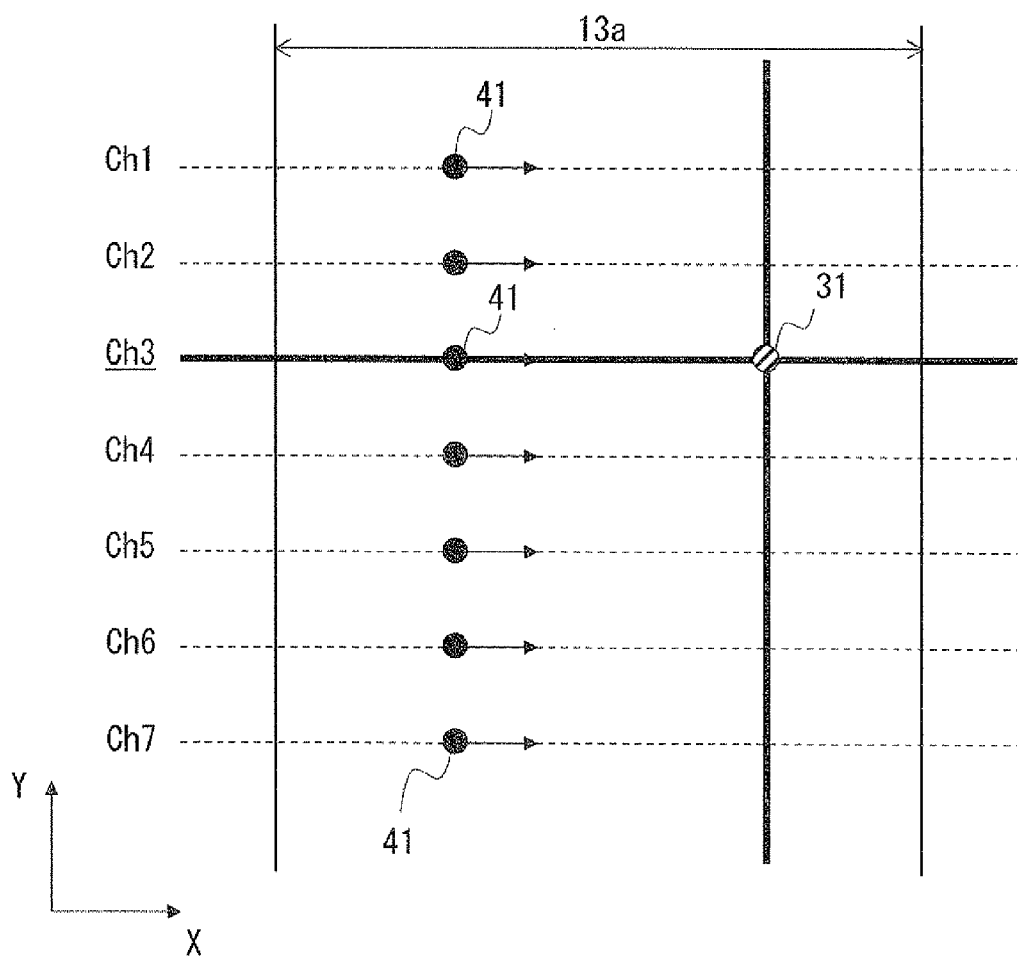
FIG. 4 is a diagram showing a scanning path of multiple beams by a polygon mirror.

Further, with reference to FIG. 4, the trajectory of the beam spots of the multiple beams in the inspection stripe region 13a will be described. FIG. 4 is a plane view showing the trajectory of beam spots 41 of the multiple beams when the polygon mirror 6 is rotated. FIG. 4 is an enlarged view of one inspection stripe region 13a of the plurality of inspection stripe regions 13a provided in the sample 13.

The beam spots 41 of the multiple beams are aligned in the Y direction. Since seven multiple beams are generated in this example, seven beam spots 41 are formed on the sample 13. The light emitted from the seven beam spots 41 is detected by different light receiving pixels of the detector 17. The respective detection signals based on the respective multiple spots are denoted by channels Ch1 to Ch7.

By rotating the polygon mirror 6, the beam spots 41 are moved in the X direction. The X direction position (X coordinate) in the inspection stripe region 13a corresponds to the rotation angle of the polygon mirror 6. When the beam spot 41 illuminates the real defect 31, the detection signal in this case changes compared with the detection signals in the normal positions. In FIG. 4, the real defect 31 exists on the scanning path of the beam spot 41 of Ch3.

The scanning range by the rotation of the polygon mirror 6 corresponds to the width in the X direction of the inspection stripe region 13a. The sample 13 can be divided into the inspection stripe regions 13a each having a width of several hundreds of μm, for example. The width of each of the inspection stripe regions 13a is determined according to the shape of the polygon mirror 6, the factor of the optical system including the objective lens 11 and the like.

The polygon mirror 6 is then rotated while moving the stage 12 in the Y direction. This moves the beam spots 41 obliquely on the sample 13. The rotation speed of the polygon mirror 6, the moving speed of the stage 12, a spot diameter and a spot interval of the multiple beams are set so that the whole part of the inspection stripe regions 13a of the sample 13 is illuminated. The signal processing device 7 sequentially compares each of the detection signals of the channels Ch1 to Ch7 with the threshold. In this way, one inspection stripe region 13a is scanned by the multiple beams. By sequentially performing multiple-beam-scanning of the plurality of inspection stripe regions 13a, the whole sample 13 is inspected.

It is assumed that the inspection stripe region 13a is a unit inspection region, and a plurality of unit inspection regions are sequentially inspected. Accordingly, it is possible to detect the presence or absence of a defect in the whole sample 13. In summary, it is possible to measure the defect candidate map in which the coordinates in the sample 13 and the presence or absence of a defect are associated with each other. As will be described below, the defect size may be associated with the defect candidate map.

One factor that causes the false defect 32 is, for example, interference fringes. Specifically, the use of laser beams with high coherence as illumination light causes bright and dark areas due to interference fringes. The false defect caused by these interference fringes tends to occur in a particular position of the inspection stripe region 13a. More specifically, the false defect 32 tends to occur when a specific beam spot 41 in the multiple beams is in a predetermined X direction position.

In order to address with this problem, a particular position in the inspection stripe regions 13a where the false defects 32 frequently occurs is masked. The position where the false defects 32 frequently occur is set to a mask position. The defect candidate in the mask position is excluded from the defect. In other words, the defect candidate in the mask position is determined as the false defect 32. The mask position is common in the plurality of inspection stripe regions 13a. The coordinates of the mask positions in all the inspection stripe regions 13a match. In this way, the common position of the plurality of inspection stripe regions 13a is set to the mask position. The signal processing device 7 performs mask processing to mask the mask position. The defect inspection is performed according to the comparison result in another region than the mask position that is masked.

Figure 5:
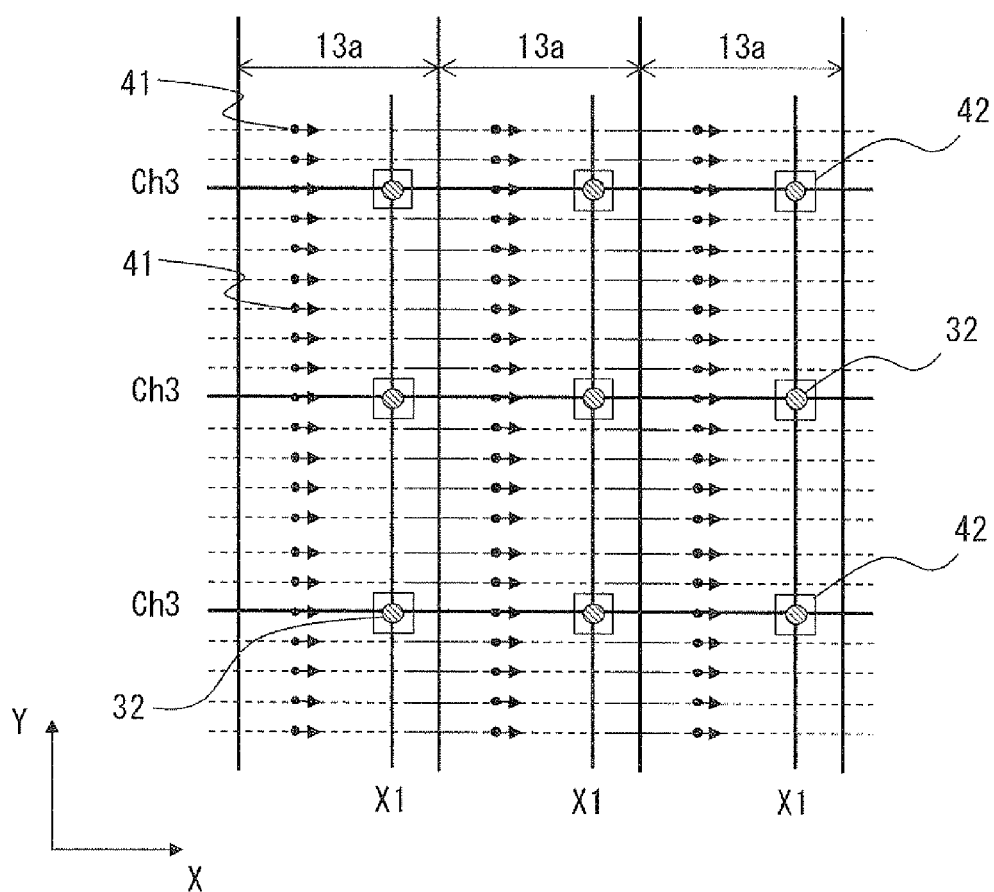
FIG. 5 is a diagram schematically showing mask positions in inspection stripe regions.

Now, with reference to FIG. 5, mask positions 42 will be described in more detail. FIG. 5 is a diagram showing the beam spots 41 and the mask positions 42 in the sample 13. FIG. 5 shows three inspection stripe regions 13a. As shown in FIG. 5, the positions where the beam spots 41 corresponding to Ch3 are in a particular X direction position X1 are set as mask positions 42. In FIG. 5, 3×3=9 mask positions 42 are set. The mask positions 42 may naturally have a constant width. The same mask positions 42 are set in the plurality of inspection stripe regions 13a. As shown in FIG. 5, the positions where the beam spots 41 corresponding to Ch3 are in X1 are set as the mask positions 42. In other words, the positions illuminated by the beam spots 41 corresponding to Ch3 when the rotation angle of the polygon mirror 6 becomes a predetermined angle are set as the mask positions 42. The probability that the false defects 32 occur is high in the mask positions 42.

There are a plurality of such mask positions 42 in one inspection stripe region 13a. For example, in each of the inspection stripe regions 13a, the mask positions 42 are aligned in the Y direction. Further, since the mask positions 42 are set only for Ch3, the mask positions 42 are evenly spaced in the Y direction. The mask positions 42 match in the plurality of inspection stripe regions 13a. As a matter of course, the mask positions 42 may be set in two or more channels, or two or more mask positions 42 may be set for one channel.

As stated above, a defect deletion flag is set as the mask position 42 only when the beam spot matches the position in the inspection stripe region 13a and the channel specified in advance. In summary, the position other than the mask position 42 where the detection signal exceeds the threshold is determined as a defect. By doing so, it is possible to delete the false defects 32 that tend to occur in particular positions. Further, since defects can be normally detected in other positions than the mask position 42, it is possible to suppress the influence on the real defects 31 as much as possible. Further, since the threshold to detect defects can be lowered, it is possible to increase detection sensitivity.

For example, the detection signal is compared with the threshold, and the position where the detection signal exceeds the threshold is determined as the defect candidate. The defect candidate map indicating whether there is a defect candidate in each of detection pixels is thus formed. The defect candidates in the mask positions 42 are removed from the defect candidate map. Specifically, the defect candidates in the mask positions 42 are set to the false defects 32 and the defect candidates in the positions other than the mask positions are set to the real defects 31. It is thus possible to definitely differentiate the real defects 31 from the false defects 32. Accordingly, the defect map of the real defects 31 indicating the positions of the real defects 31 together with the defect size can be measured.

Furthermore, in this embodiment, it is determined whether a defect is the real defect 31 or the false defect 32 according to the defect size of the defect candidate detected in the mask position 42. Since the false defect 32 caused due to interference fringes occurs under a particular scanning condition, the size of the false defect 32 is relatively small. The detected defect candidate whose size is smaller than an erase size in the mask position 42 is determined as the false defect 32. The erase size is a threshold to determine whether the defect candidate in the mask position 42 is the real defect 31 or the false defect 32. In other words, when the size of the defect candidate detected in the mask position 42 is smaller than the erase size, the defect candidate is determined as the false defect 32 and is erased from the defect candidate map. Meanwhile, when the size of the defect candidate detected in the mask position 42 is larger than the erase size, the defect candidate is determined as the real defect 31 and is added to the defect map.

Such erase size is set for each of the mask positions 42. For example, different erase sizes may be set in the mask positions 42 of different channels. Further, different erase sizes may be set in the mask positions 42 of different X positions. The same erase size may be set in the mask positions 42 in the same channel and the same X position. In summary, since the scanning condition is the same in the mask positions 42 in the same channel and the same X position, the same erase size is preferably set.

When the detection signals successively exceed the threshold for a predetermined period of time or longer, for example, this position is determined as the real defect 31 since the defect size is large. When the time during which the detection signals successively exceed the threshold is shorter than a predetermined period of time, the defect candidate in this mask position is determined as the false defect since the defect size is small. In this way, it is determined whether the defect candidate is the real defect 31 or the false defect 32 according to the size. As a matter of course, the defect candidate of the defect candidate map may be determined as the real defect 31 according to the defect size in the X direction and the Y direction. The erase size of the defect candidate may be set according to the scanning speed or the like of the polygon mirror 6. In this way, it is possible to perform inspection with higher accuracy.

When there is a real defect 31 with small size in the mask position 42, there is a possibility that the real defect 31 is not detected. Specifically, the real defect 31 may be masked in the mask position 42. The probability that the real defect 31 is erased from the defect candidates will be described below.

Assuming that an addition of the mask widths of all the channels in which mask positions are set as (total width of mask positions), the probability that the real defect 31 is erased can be derived by the following expression.

Erasure probability of real defect 31=(total width of mask positions)/(total number of channels×width of inspection stripe regions)×(the number of defect candidates equal to or smaller than erase size)/(total number of defect candidates)

By reducing the total width of the mask positions 42, it is possible to reduce the erasure probability of the real defect 31. Specifically, by reducing the proportion of the area of the mask positions 42 in the inspection stripe regions 13a, it is possible to reduce the erasure probability of the real defect 31. Further, by reducing the erase size, it is possible to reduce the erasure probability of the real defect 31 in the mask position 42. In this way, since the real defect 31 depends on the total area of the mask positions and the erase size, the erasure risk of the real defect 31 can be substantially negligible.

Further, the mask position 42 may be set according to the sample 13. For example, the detection signal is extracted for a part of the inspection stripe regions 13a of the sample 13. The mask position 42 may be set according to the defect candidate map in a part of the regions of the sample 13.

When the mask position 42 is set, for example, inspection is performed under a condition that the mask position 42 is not set in advance. For example, the detection signals of two or more inspection stripe regions 13a are compared with the threshold. The position in which the probability that the detection signals exceed the threshold is high in the inspection stripe region 13a is set to the mask position 42. The threshold when the mask position 42 is set is sufficiently low so that the false defect 32 easily occurs. In summary, the mask position 42 is set based on the number of defect candidates when the inspection is performed with high detection sensitivity. In this way, it is possible to set the mask position 42 in a simple manner.

Furthermore, by focusing on the X direction position and the Y coordinate in the inspection stripe region 13a of the defect candidate that is detected when the mask position 42 is set, it is possible to set the mask position 42 with higher accuracy. More specifically, the mask position 42 is set only for the defect candidate detected in the same X direction position in the plurality of inspection stripe regions 13a. Alternatively, the mask position 42 is set only for the defect candidate detected in a position spaced in the Y direction. As a matter of course, both of them may be combined. By doing this, even when the mask position 42 is set in a region which happens to include the real defect 31, the probability that the real defect is detected in the same channel in the same X direction position or a position spaced in the Y direction in the plurality of inspection stripe regions 13a is substantially 0, thereby being able to accurately set the mask position 42 without being influenced by the real defect 31.

Such mask position 42 is determined only by the optical system. Thus, when there is a change in the configuration of the optical system, the mask position 42 is preferably changed. For example, setting of the mask position 42 is updated when a filter is inserted into the optical system or the light source 1 is adjusted. Further, maps of a plurality of patterns of mask positions 42 may be prepared in advance, and an appropriate map may be selected according to the sample 13. For example, a plurality of maps of the mask positions 42 are set according to the reflectance of the sample 13. The sample 13 with high reflectance and the sample 13 with low reflectance use different maps of the mask positions 42. Furthermore, the size of the mask position 42 may be changed according to a desired detection sensitivity.

Further, when there is a change in a position in the inspection stripe region 13a or the channel where interference fringes occur, the mask position 42 may be automatically adjusted. For example, inspection is performed on a part of the plurality of inspection stripe regions 13a included in one sample 13. Then the detection signal of the part of the inspection stripe regions 13a and the threshold are compared to detect the defect candidate. The position where the probability that the defect candidate occurs is equal to or larger than a certain percentage is set as the mask position 42. In this way, it is possible to set the X direction position and the channel of the mask position 42. The whole sample 13 is thus inspected using the mask position 42 that is set. Further, when the sample 13 is changed, the mask position 42 is set from the defect candidate map for a part of the inspection stripe regions 13a of the sample 13. The whole sample 13 is then inspected using the map of the mask position 42. In this way, it is possible to set appropriate mask positions 42, which achieves inspection with higher accuracy. When the mask position 42 is set, as stated above, it is preferable to inspect at least two inspection stripe regions 13a and to focus on the X direction position and the Y coordinate in the inspection stripe region 13a of the defect candidate.

For more accurate inspection, it may also be possible to automatically adjust the mask position 42 using previous inspection results every time the inspection stripe region 13a is inspected while performing inspection of the sample 13.

Figure 6:
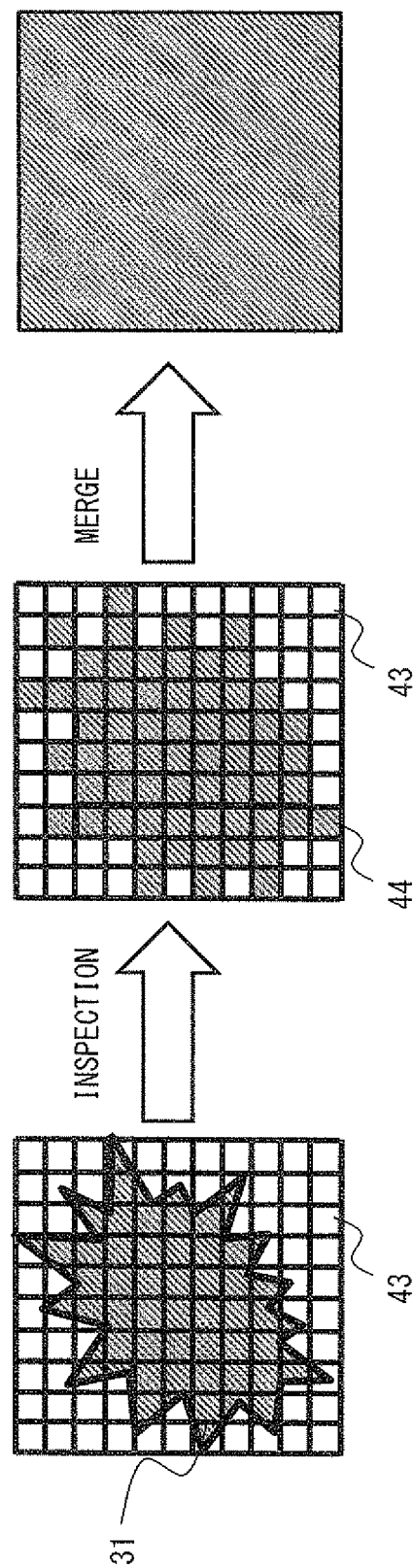
FIG. 6 is a diagram showing merge processing when mask processing is not performed.
Figure 7:
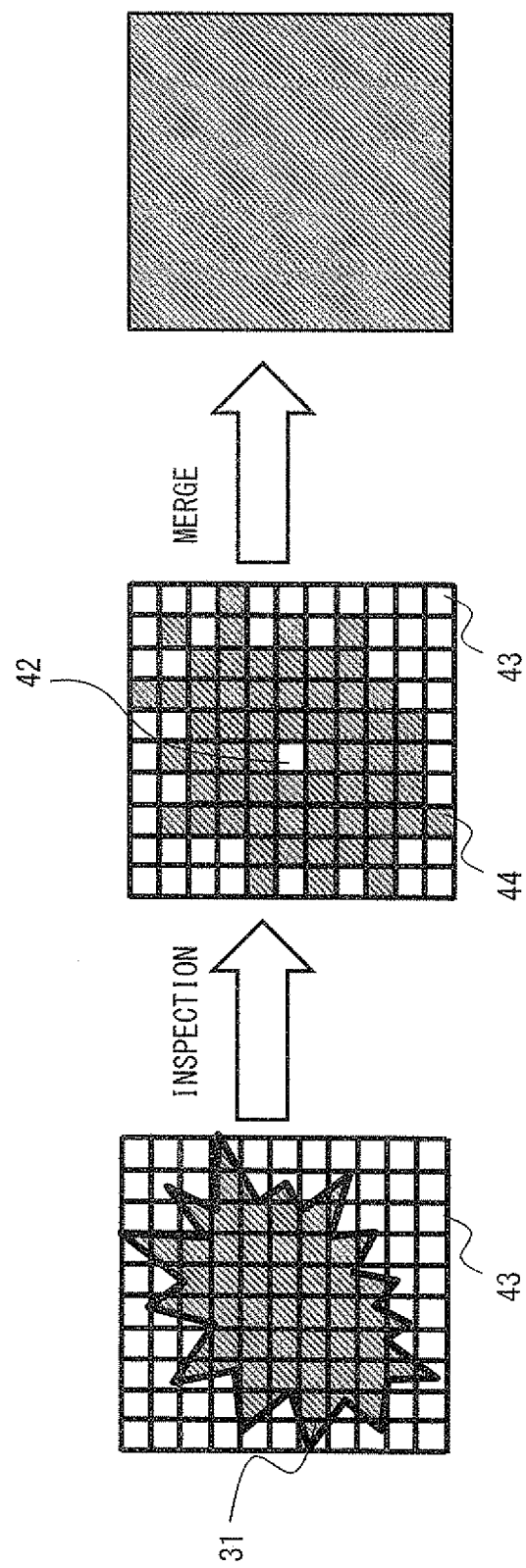
FIG. 7 is a diagram showing merge processing when mask processing is performed.

Furthermore, in order to specify the defect size, processing for merging the defect candidates may be performed after the false defects 32 are erased. In the merge processing, two real defects 31 that are within a certain distance are synthesized to generate one real defect 31. For example, with reference to FIGS. 6 and 7, merge processing in a case in which the mask position 42 is not provided and a case in which the mask position 42 is provided will be described. FIG. 6 is a diagram showing merge processing in the case in which the mask position 42 is not provided, and FIG. 7 is a diagram showing merge processing in the case in which the mask position 42 is provided. In FIGS. 6 and 7, partitioned small rectangles are detection pixels 43. The comparison between the detection signal with the threshold is performed for each of the detection pixels 43, whereby the defect map is generated.

FIGS. 6 and 7 each include a huge real defect 31 extending to the plurality of detection pixels 43. While the arrangement of defect candidates 44 in which detection signals exceed the threshold is substantially equal in FIGS. 6 and 7, the defect candidate 44 is erased only in the mask position 42 in FIG. 7. Since the defect candidate 44 is deleted only in the mask position 42, the arrangement of the defect candidates 44 in other areas than the mask position 42 is the same.

Even when the mask position 42 is provided, there are defect candidates 44 in the surrounding areas thereof. Accordingly, by performing merge processing, the eventual size of the real defect 31 can be made equal. For example, when the defect size of the real defect 31 is sufficiently larger than the erase size, there is a defect candidate 44 in the detection pixel 43 which is next to the mask position 42. Since there is a defect candidate within a predetermined distance from the defect candidate 44, the mask position 42 is merged into the neighboring defect candidate. By performing merge processing, the mask position 42 also becomes the real defect 31. In this way, by performing merge processing after masking the mask position 42, it is possible to suppress the influence on the size of the real defect 31. It is thus possible to accurately measure the defect size.

Figure 8:
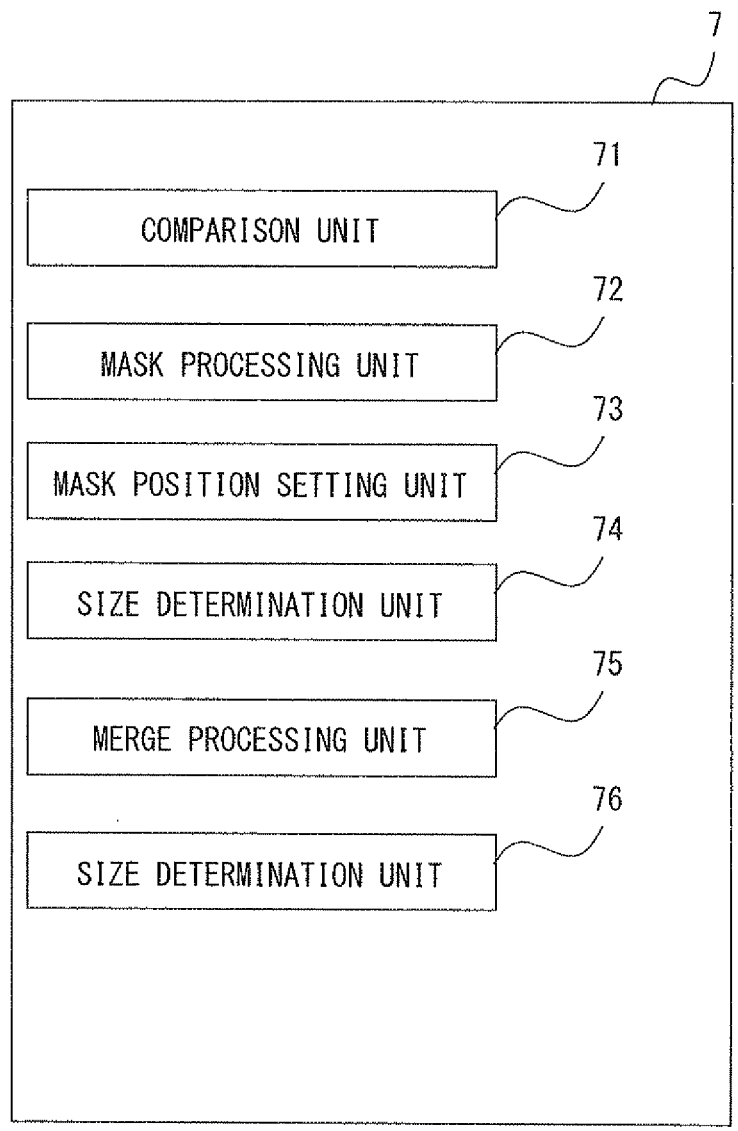
FIG. 8 is a block diagram showing a signal processing device of the defect inspection device according to the embodiment.

Hereinafter, with reference to FIG. 8, a configuration of the signal processing device 7 that performs the above processing will be described. FIG. 8 is a block diagram showing a configuration of the signal processing device 7. The signal processing device 7 includes a comparator 71, a mask processing unit 72, a mask position setting unit 73, a size determination unit 74, a merge processing unit 75, and a size determination unit 76.

The comparator 71 compares a predetermined threshold with the detection signals from the detector 17. For example, a defect candidate map is generated in which the defect candidate and its XY coordinates are associated with each other from the results of comparing the detection signals with the threshold. The mask position setting unit 73 sets the mask position to mask the defect candidate. Specifically, the mask position setting unit 73 stores the X direction position in the inspection stripe region 13a for a specific channel as the mask position 42. As a matter of course, when the mask position 42 is set for the plurality of channels, the X direction position which is the mask position 42 is set for each channel. The mask position setting unit 73 sets the common mask position for the plurality of inspection stripe regions 13a.

The mask processing unit 72 refers to the mask position 42 set by the mask position setting unit 73 to perform mask processing. The mask processing unit 72 detects defects based on the comparison results in the comparator 71 in other positions than the mask position 42 set by the mask position setting unit 73. In this way, it is possible to appropriately eliminate the false defects 32 detected as defect candidates. Then, the mask processing unit 72 generates a defect map in which the size and the position of the real defect 31 are associated with each other.

The size determination unit 74 determines whether the defect candidate in the mask position 42 is equal to or smaller than the erase size, to determine whether the defect candidate in the mask position 42 in the defect candidate map is the real defect 31 or the false defect 32. The erase size may be determined by the size in the X direction or the size in the Y direction. Alternatively, the erase size may be determined by both sizes of the X direction and the Y direction. In the mask position 42, the defect candidates equal to or smaller than the erase size are determined as the false defects 32 and are deleted from the defect candidate map. In the mask position 42, the defect candidates larger than the erase size are determined as the real defects 31 and are added to the defect map generated by the mask processing unit 72.

Note that the mask processing unit 72 may perform mask processing after the size determination unit 74 determines the size of the defect candidate. For example, when only one erase size is set, the defect candidates larger than the erase size are extracted as the real defects 31. Then, the size determination unit 74 creates a defect map of the real defects 31 larger than the erase size. After that, the defect candidate of the mask position 42 is erased among the defect candidates equal to or smaller than the erase size. Then, defect candidates other than the mask position 42 are extracted as the real defects 31. Then, the real defects 31 detected in other positions than the mask position 42 are added to the defect map. The mask processing in the mask processing unit 72 and the size determination processing in the size determination unit 74 are not particularly limited as long as the processing can be made by the signal processing device 7. For example, the aforementioned processing may be performed by a computer program in the signal processing device 7.

The merge processing unit 75 performs merge processing on the defect candidate map in which defect candidates are erased in the mask processing unit 72 and the size determination unit 74. Accordingly, when there is a defect candidate near the mask position 42, the mask position 42 is merged to a defect candidate near the mask position 42. Then, the size determination unit 76 determines the size of the defect merged by the merge processing unit 75. In short, the neighboring defect candidates are regarded as one real defect 31, and the size of the real defect 31 is measured. In this way, it is possible to accurately measure the defect size.

Accordingly, it is possible to measure the defect map in which the coordinate is associated with the defect size. Further, since the mask position 42 is set for the inspection stripe regions 13a, it is possible to prevent detection of the false defect 32. Thus, even when bright and dark areas of interference fringes are formed, it is possible to reduce the probability that the false defects 32 are detected. Accordingly, it is possible to lower the threshold and to achieve defect inspection with high sensitivity. Further, the position which does not depend on the pattern of the sample 13 is set as the mask position 42. It is therefore possible to perform inspection even when the pattern shape or the like of the sample 13 is not known in advance. It is therefore possible to set the mask position 42 only by the optical system without taking consideration of the illumination position in the sample 13.

Further, the mask position setting unit 73 sets the mask position 42 according to the comparison result in the comparator 71. The mask position setting unit 73 specifies the position where the defect candidates tend to occur from the defect candidate map in the plurality of inspection stripe regions 13a, for example. The position where a defect candidate occurs with a predetermined probability or more is set as the mask position 42. In this way, it is possible to appropriately set the mask position and to perform inspection more accurately.

While multiple beams have been used in the description above, it is also possible to apply the mask processing stated above to a defect inspection device that uses a single beam. In this case, a specific position in the scanning direction (e.g., X direction) of the light beam in the inspection stripe region 13a is the mask position 42. Specifically, the inspection stripe region 13a according to the movement of the stage 12 is masked at a timing at which the scan angle of the polygon mirror 6 becomes a predetermined angle. In this way, it is possible to suppress occurrence of the false defect 32, and to perform inspection with high sensitivity. Needless to say, the light beams can be scanned by deflecting means other than the polygon mirror 6.

Further, the mask processing stated above may also be applied to a defect inspection device which does not perform beam scanning. The mask processing stated above may also be applied to a defect inspection device which repeatedly performs image taking by a camera by moving a stage or the camera. For example, when the stage or the like is driven to move the relative position between a CCD camera and the sample 13, a specific light receiving pixel of a two-dimensional CCD camera is the mask position. In this case, the unit inspection region is determined by the field of view of the two-dimensional CCD camera. A common light receiving pixel of a plurality of captured images is then set to the mask position.

As described above, the unit inspection region is determined based on the optical system of the defect inspection device, and the unit inspection region is set so that the scanning condition and the image pickup condition are the same in the plurality of unit inspection regions. In summary, the unit inspection region is a region having a predetermined size which does not depend on the pattern of the sample 13. It is therefore possible to perform inspection regardless of the pattern of the sample 13, thereby being able to perform inspection in a simple manner.

In the description above, when the detection signal is below a threshold, it is determined as a defect candidate. However, it may be determined as a defect candidate when the detection signal is above the threshold. In summary, one or both of an upper limit value and a lower limit value may be set for the detection signal. When both of the lower limit value and the upper limit value are set, the mask position 42 may be set for each threshold, or the same mask position 42 may be set.

The defect inspection program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A defect inspection device comprising:
a light source that illuminates a sample;
a detector that receives light from an illuminated region of the sample;
a first scanning unit comprising a polygon mirror, a galvano mirror, MEMS (micro electronics mechanics systems) mirror or a movable stage that changes a relative position between light from the light source and the sample in order to sequentially inspect a plurality of unit inspection regions;
a comparison unit comprising a comparator that compares a detection signal output from the detector according to scanning in the first scanning unit with a threshold, the comparison unit further detects a defect candidate according to a result of a comparison;
a mask position setting unit in a signal processor that sets a common position of the plurality of unit inspection regions as a mask position in order to mask the common position when the first scanning unit sequentially inspects the plurality of unit inspection regions, the mask position setting unit further sets a position where the defect candidate is detected in at least two of the unit inspection regions as the mask position for the plurality of the unit inspection regions; and
a mask processing unit in the signal processor that detects a defect based on a comparison result in the comparison unit in another region than the mask position set by the mask position setting unit.

2. The defect inspection device according to claim 1, wherein the unit inspection region has a predetermined size which does not depend on a pattern of the sample.

3. The defect inspection device according to claim 1, further comprising a second scanning unit that deflects illumination light in the unit inspection region,
wherein the mask position is set in the unit inspection region based on at least one of a predetermined scanning position in a scanning direction of the second scanning unit and a predetermined position in a direction perpendicular to the scanning direction.

4. The defect inspection device according to claim 1, further comprising a multiple-beam conversion unit comprising a beam splitter that converts the light from the light source into multiple beams including a plurality of light beams,
wherein the mask position is set only for a part of the plurality of light beams.

5. The defect inspection device according to claim 1, comprising:
a comparison unit in the signal processor that detects a defect candidate according to a result of a comparison of the detection signal with the threshold and
a size determination unit in the signal processor that determines that the defect candidate is a defect when a size of the defect candidate in the mask position is larger than an erase size.

6. The defect inspection device according to claim 1, comprising:
a comparison unit in the signal processor that detects a defect candidate according to a result of a comparison of the detection signal with the threshold; and
a merge processing unit in the signal processor that merges a defect candidate according to a distance to a neighboring defect candidate after the mask position is masked.

7. The defect inspection device according to claim 1, wherein the mask position is set based on a comparison result in a part of the plurality of unit inspection regions.

8. The defect inspection device according to claim 1, wherein the mask position is adjusted for each of the unit inspection regions according to the comparison result in the comparison unit.

9. A defect inspection method comprising the steps of:
illuminating a sample;
receiving light from an illuminated region of the sample to output a detection signal;
changing a relative position between light from a light source and the sample to perform a first scanning in order to sequentially inspect a plurality of unit inspection regions;
comparing a detection signal output from the detector with a threshold according to the first scanning and detecting a detect candidate according to the result of a comparison;
setting a common position of the plurality of unit inspection regions as a mask position in order to mask the common position when the plurality of unit inspection regions are sequentially inspected by the first scanning;
setting a position where the defect candidate is detected in at least two of the unit inspection regions as the mark position for the plurality of the unit inspection regions; and
detecting a defect based on a result of comparing the detection signal with the threshold in another region than the mask position.

10. The defect inspection method according to claim 9, wherein the unit inspection region has a predetermined size which does not depend on a pattern of the sample.

11. The defect inspection method according to claim 9, further comprising a step of performing a second scanning by deflecting illumination light in the unit inspection region,
wherein the mask position is set in the unit inspection region according to at least one of a predetermined scanning position in a scanning direction of the second scanning and a position perpendicular to the scanning direction.

12. The defect inspection method according to claim 9, further comprising a step of converting the light from the light source into multiple beams including a plurality of light beams, wherein the mask position is set only for a part of the plurality of light beams.

13. The defect inspection method according to claim 9, comprising:

detecting a defect candidate according to a result of comparing the detection signal with the threshold; and determining that the defect candidate is a defect when a size of the defect candidate in the mask position is larger than an erase size.

14. The defect inspection method according to claim 9, further comprising the steps of:

detecting a defect candidate according to a result of comparing the detection signal with the threshold; and merging a defect candidate according to a distance to a neighboring defect candidate after masking the mask position.

15. The defect inspection method according to claim 9, comprising setting the mask position based on a comparison result in a part of the plurality of unit inspection regions.

16. The defect inspection method according to claim 9, comprising adjusting the mask position for each of the unit inspection regions according to the comparison result in the comparing step.

17. A non-transitory computer readable medium storing a defect inspection program for performing defect inspection using a detection signal from a detector that receives light from an illuminated region of a sample, the defect inspection program causing a computer to execute the following steps of:

changing a relative position between light from a light source and the sample to perform a first scanning in order to sequentially inspect a plurality of unit inspection regions;

comparing a detection signal output from the detector with a threshold according to the first scanning and detecting a detect candidate according to the result of a comparison;

setting a common position of the plurality of unit inspection regions as a mask position in order to mask the common position when the plurality of unit inspection regions are sequentially inspected by the first scanning;

setting a position where the defect candidate is detected in at least two of the unit inspection regions as the mark position for the plurality of the unit inspection regions; and detecting a defect based on a result of comparing the detection signal with the threshold in another region than the mask position.

* * * * *